(12) United States Patent
Hill

(10) Patent No.: US 10,031,230 B2
(45) Date of Patent: Jul. 24, 2018

(54) METHOD FOR OPTICALLY MEASURING DISTANCES IN THE NEAR AND FAR RANGE

(71) Applicant: Mechaless Systems GmbH, Bruchsal (DE)

(72) Inventor: Uwe Hendrik Hill, Remchingen (DE)

(73) Assignee: Mechaless Systems GMBH, Bruchsal (DE)

(*) Notice: Subject to any disclaimer, the term of this patent is extended or adjusted under 35 U.S.C. 154(b) by 317 days.

(21) Appl. No.: 14/784,795

(22) PCT Filed: Mar. 28, 2014

(86) PCT No.: PCT/EP2014/056359
§ 371 (c)(1),
(2) Date: Oct. 15, 2015

(87) PCT Pub. No.: WO2014/170118
PCT Pub. Date: Oct. 23, 2014

(65) Prior Publication Data
US 2016/0077208 A1 Mar. 17, 2016

(30) Foreign Application Priority Data

Apr. 17, 2013 (WO) .................. PCT/EP2013/058010

(51) Int. Cl.
*G01S 17/32* (2006.01)
*G01S 17/36* (2006.01)
(Continued)

(52) U.S. Cl.
CPC ............ *G01S 17/32* (2013.01); *G01S 7/4802* (2013.01); *G01S 17/36* (2013.01); *G01S 17/46* (2013.01)

(58) Field of Classification Search
CPC .......... G01C 3/085; G01C 3/08; G01S 17/36; G01S 17/48
See application file for complete search history.

(56) References Cited

U.S. PATENT DOCUMENTS

| 4,699,507 | A | 10/1987 | Etoh |
| 6,288,777 | B1 | 9/2001 | Froehlich et al. |

(Continued)

FOREIGN PATENT DOCUMENTS

| CN | 102565803 A | 7/2012 |
| DE | 19851307 A1 | 4/2004 |

(Continued)

OTHER PUBLICATIONS

International Search Report and Written Opinion for corresponding PCT Application No. PCT/EP2014/056359, dated May 22, 2014 (10 pgs.).

(Continued)

*Primary Examiner* — Luke D Ratcliffe
(74) *Attorney, Agent, or Firm* — Shumaker & Sieffert, P.A.

(57) ABSTRACT

In a method for optically measuring the properties of at least one measurement path (I1, I2) between a transmitter (H) and a receiver (D), the receiver (D) receives an optical signal from a compensation transmitter (K) in addition to an optical signal from the transmitter (H). The signal of the transmitter (H) is reflected by an object (O) or is transmitted to the receiver (D) by means of said object in a different manner. The output signal (SO) of the receiver (D) is fed to a controller (CT), which changes the transmitter feed signal (S5) and/or compensation feed signal (S3) in accordance with a control algorithm. In the process, the controller (CT) determines two signals or values, which represent control parameters (S4a, S4φ) for magnitude and phase or magnitude and delay. In a stage downstream of the controller (CT), (Continued)

the presence and/or the distance (r) of an object (O) is determined from said two control parameters (S4a, S4φ) in dependence on at least one of said two parameters, either from both parameters or from one of the two parameters.

9 Claims, 5 Drawing Sheets

(51) Int. Cl.
    *G01S 17/46*     (2006.01)
    *G01S 7/48*     (2006.01)

(56) References Cited

U.S. PATENT DOCUMENTS

| | | | |
|---|---|---|---|
| 2007/0211329 A1* | 9/2007 | Haase | G01C 3/085 |
| | | | 359/279 |
| 2008/0197835 A1 | 8/2008 | Reime | |
| 2010/0182588 A1 | 7/2010 | Reime | |
| 2012/0119091 A1* | 5/2012 | Hong | G01S 7/4802 |
| | | | 250/349 |

FOREIGN PATENT DOCUMENTS

| | | |
|---|---|---|
| DE | 10300224 A1 | 7/2004 |
| DE | 102004037137 A1 | 3/2006 |
| DE | 102006020570 A1 | 11/2007 |
| DE | 102006057495 A1 | 8/2008 |
| DE | 102007005187 A1 | 9/2008 |
| EP | 1913420 B1 | 7/2006 |
| EP | 2455776 A1 | 5/2012 |
| WO | 2006024566 A1 | 3/2006 |
| WO | 2014166835 A1 | 10/2014 |
| WO | 2014170118 A1 | 10/2014 |

OTHER PUBLICATIONS

Translation of First Office Action from counterpart Chinese Application No. 201480021942.6, dated Aug. 22, 2016, 7 pp.

* cited by examiner

METHOD FOR OPTICALLY MEASURING DISTANCES IN THE NEAR AND FAR RANGE

CROSS REFERENCE TO RELATED APPLICATIONS

This application is a national stage application under 35 U.S.C. § 371 of PCT Application No. PCT/EP2014/056359, filed Mar. 28, 2014, which claims the benefit of and priority from PCT Application No. PCT/EP2013/058010, filed Apr. 17, 2013. The entire contents of each of PCT Application No. PCT/EP2014/056359 and PCT Application No. PCT/EP2013/058010 are incorporated herein by reference.

INTRODUCTION AND STATE OF THE ART

The invention relates to a method for optical distance measurement in the near and far range, and particularly a method for detecting the distance of an object which is reflective and/or transmissive to electromagnetic radiation to an optically operating sensor system whose optical detection range can be subdivided at least into a near and a far range.

For detection of three-dimensional gestures such as e.g. swiping and approach gestures, sensors are required which are adapted to detect the position, movement and orientation of hands.

Apart from the use of cameras, the use of simple concepts based on LEDs and photodiodes is of special interest because of the cost factor involved.

In this respect, a special problem known from the state of the art resides in how to achieve a measurement in the near range and, at the same time, good recognition of gestures in the far range. Corresponding measures are known e.g. from DE-A-103 00 224 or DE-A-10 2006 020 570.

Due to the speed of light and respectively due to the resultant short time of light propagation in the near range, it is exactly in case of small distances that optical distance measurements based on measurement of the propagation time can be realized only with considerable difficulties or only with high technical expenditure.

In case of larger distances, it is possible to use methods based on the propagation time, such as those known from EP-B-1 913 420 or DE-A-10 2007 005 187. Systems for detection of at least one physical magnitude on the basis of the relationship between a transmission signal and a reception signal are known from DE-A-10 2006 057 495 and DE-A-198 51 307.

Exactly in regard to the relevant economical conditions, there is presently not known a solution in the state of the art which, particularly under the cost aspect, could fulfill the commercial and technical prerequisites for an optical distance measurement to be used e.g. for simple recognition of gestures, notably both in the far range and particularly in the near range. A typical application for such a technology is e.g. the control of menus of a screen or of other functions which nowadays are typically controlled with the aid of mouse.

In this respect, systems are known from the state of the art (FIG. 4) wherein a generator G will generate a transmitter supply signal S5 to be supplied to a useful transmitter H. Subsequent to signal passage through the measurement path, consisting of I1 and I2, which is to be measured, said useful transmitter H will transmit into a receiver D. The receiver output signal S0 of receiver D will be processed, by a feedback controller CT, into a compensation supply signal S3 to be fed to a compensation transmitter K which again, typically with linear overlap, will transmit into the receiver D via compensation transmission path I3. In the process, with the aid of feedback controller CT, said compensation supply signal S3 will be generated from the receiver output signal S0 and the transmitter supply signal S5 in such a manner that the transmitter output signal S0, except for a control error and system noise, will not contain any components of the transmitter supply signal S5 anymore. Herein, the feedback controller will control the compensation supply signal S3 for compensation not only in the amplitude but also in the phase. In the process, the feedback controller will typically output two control signals S4a and S4φ representing the amplitude (control signal S4a) and the phase (control signal S4φ) of the compensation signal.

Further, from the state of the art, systems (FIG. 5) are known wherein a generator G will generate a compensation supply signal S3 to be fed to the compensation transmitter K. Said compensation transmitter K will transmit into a receiver D, subsequent to signal passage through the compensation transmission path I3. The receiver output signal S0 of receiver D will be processed, with the aid of a feedback controller CT, into a transmitter supply signal S5 to be supplied to a useful transmitter H which again, typically with linear overlap—after signal passage through the first section I1 of measurement path I1,I2, reflection at an object O or passage through the object O and subsequent passage through the second section I2 of measurement path I1,I2—will be transmitted into receiver D. Besides, it can also be conceived that the fluorescence of the object O shall be detected, i.e. that the fluorescence of object O is the signal which is to be detected. In the process, with the aid of feedback controller CT, the transmitter supply signal S5 will be generated from the receiver output signal S0 and the compensation supply signal S3 in such a manner that the transmitter output signal S0, except for a control error and system noise, will not contain any components of the compensation supply signal S3 anymore. Herein, the feedback controller will control the transmitter supply signal S5 for compensation not only in the amplitude but also in the phase. In the process, the feedback controller will typically output two control signals S4a and S4φ representing the amplitude (control signal S4a) and the phase (control signal S4φ) of the transmission signal.

Mixed forms of these two basic methods described in the above mentioned documents, particularly also with control of the transmitter and/or compensation transmitter, can be conceived as well.

Such systems, hereunder referred to as HALIOS-IRDM systems, are particularly robust against sources of interference such as e.g. sunlight, while at the same time being robust against contamination and against drift of the receiver D.

The phase signal S4φ represents the light propagation time needed by the measurement signal for its passage along the measurement path consisting of the sections I1 and I2.

The amplitude signal S4a represents the weakening experienced by the measurement signal during its passage along the measurement path consisting of the sections I1 and I2.

OBJECT OF THE INVENTION

Figure 1:
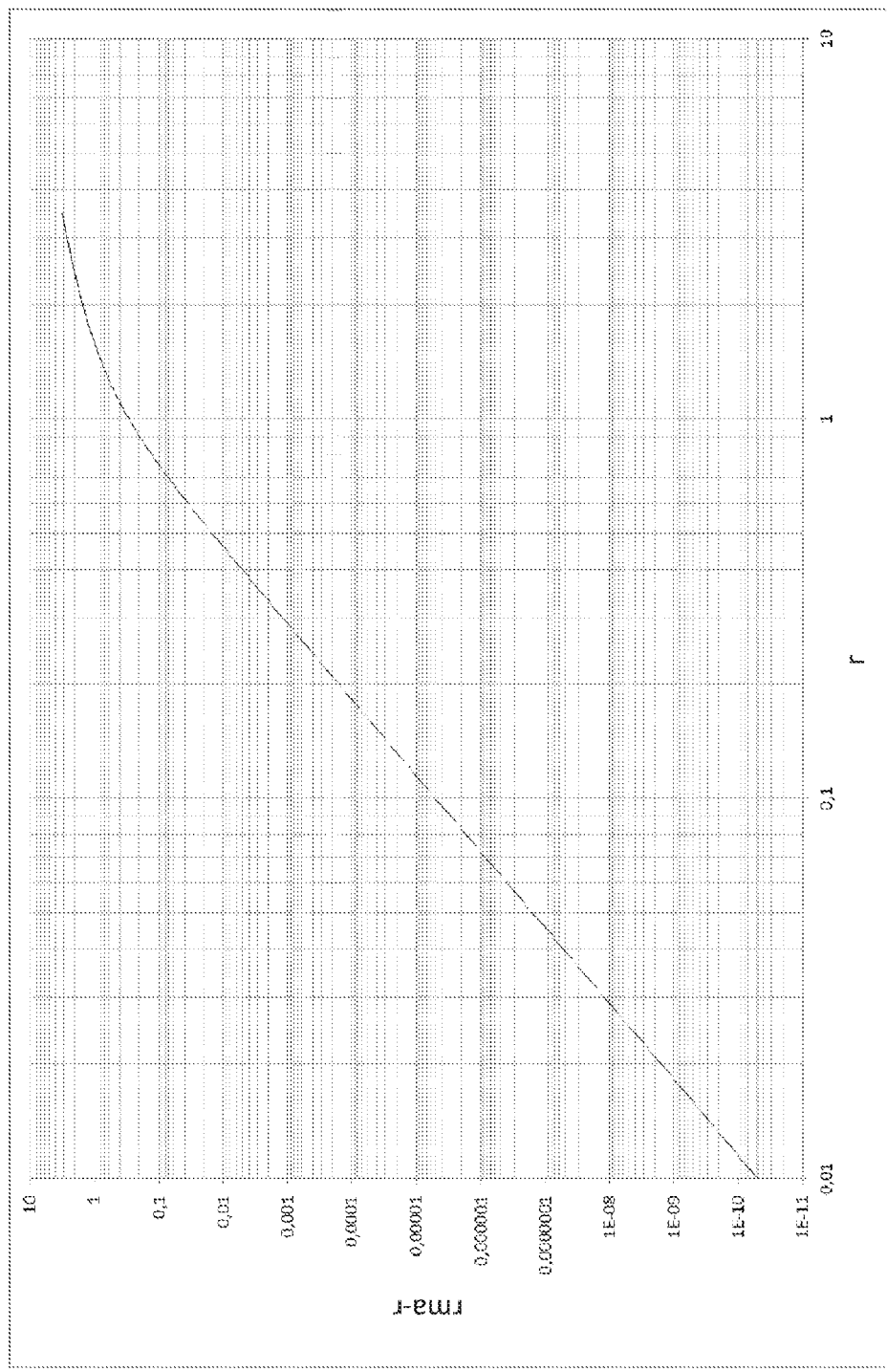
FIG. 1 is a graph illustrating the development of an error $r_{ma}$-r in dependence on a distance r in dual-logarithmic representation.

It is an object of the invention to provide a simple measurement system which is robust against interference by extraneous light and which, both in the near range and in the far range, will deliver good measurement values of the distance of the object to the sensor system and, thus, good recognition results.

According to the invention, said object is achieved by a method as defined in claim 1 and by a device as defined in claim 9; individual modifications of the invention are the subject matter of the subclaims.

DESCRIPTION OF THE INVENTION

The invention starts from a sensor system for optical distance measurement which comprises a transmitter for transmitting an optical signal (electromagnetic radiation) and a receiver for receiving an optical signal and respectively the optical signal (electromagnetic radiation). By an object situated in the detection range located in front of the sensor system, the electromagnetic radiation emitted by the transmitter will forwarded to the receiver. On the basis of the signal amplitude or the signal propagation time, it will now be possible to conclude to the distance of the object to the sensor system and respectively to the receiver. If it is desired to measure, in this manner, the position of an object in space or across a surface (3D and respectively 2D application), it is required to use a corresponding number of transmitters which will be suitably controlled successively and in a cyclically repetitive manner or in a variable order adapted to the current conditions. With the aid of a compensation transmitter, it is possible to compensate for influences of ambient light, which, however, is generally known.

According to the invention, it is now provided, in such a system, that
  the detection range is divided at least into a far range and a near range,
  an object (O), when approaching toward the sensor system, is moved first through the far range and subsequently through the near range of the detection range,
  with the object (O) being in the far range, its distance to the sensor system is detected on the basis of the running-time information of the received optical signal, and
  with the object (O) being in the near range, its distance to the sensor system is detected on the basis of an assumed value or a computed value of the optical parameter of the object (O) and on the basis of the amplitude information of the received optical signal.

It is an essential feature of the invention that, in dependence on the precision with which the signal amplitude information and the signal propagation time information can be extracted from the received optical signal, there is used either of the signal amplitude information or the signal propagation time information for detecting the distance of the object to the sensor system (or, more precisely, to the receiver of the system). A difficulty in the distance measurement based on the signal amplitude information resides in that the optical parameter of the object that describes the reflection and/or transmission capacity of the object is not exactly known. This parameter has to be first computed, while it is also possible to work with an assumed value as a "starting value". In this regard, use is made of the recognition that this optical parameter can be computed due to the fact that an object approaching toward the sensor system will travel first through the far detection range and then through the near detection range of the system. In the far detection range, however, the distance detection can performed quite accurately on the basis of the signal propagation time information. If, then, the distance value detected previously on the basis of the signal propagation time information, is included as a known value into the computation rule for distance detection on the basis of the signal amplitude information, the optical parameter (reflection and/or transmission coefficient) can be computed. This known value will from then on be available so that, when the object reaches the detection range of the sensor system, the distance detection will be performed on the basis of the signal amplitude information. This is because, in the near detection range of the sensor system, the distance detection on the basis of the signal amplitude information of the received optical signal can be performed in a simpler manner than with the aid of the signal propagation time information.

According to a further advantageous embodiment of the invention, it can thus be provided that, if the object (O) is situated in the far range, the optical parameter is computed, notably on the basis of the distance of the object (O) to the sensor system as detected from the running-time information of the received optical signal, and on the basis of the amplitude information of the received optical signal.

Further, it is suitable if the optical parameter of the object (O) is respectively updated with each approach of the object (O) to the sensor system. By way of continuous computation of the optical parameter of the object during the approach of the latter to the sensor system as long as the object is still situated in the far detection range, the optical parameter can be determined with ever more increasing precision.

According to a further advantageous embodiment of the invention, it can be provided that the updated optical parameter is each time stored and is used for the subsequent detection of the distance of the object in the near range to the sensor system. Additionally or alternatively, it is also possible to preset a value for the optical parameter in dependence on the per se known optical nature of the to-be-expected objects whose distances to the sensor system shall be detected. In case that the invention is applied for recognition of gestures, there can be preset e.g. the reflection coefficient for skin that will occur at the radiation used (wavelength). Herein, however, it could be a problem that this reflection coefficient will vary in dependence on the tone of the skin. In such a case, the initial computations as described above could be carried out for different assumed reflection coefficients so that then, on the basis of the distance values resulting from these different coefficients, by matching the distance value with the distance value detected on the basis of the propagation time information, there will be detected the "fitting" reflection coefficient which, from then on, is to be used for distance measurement based on the signal amplitude information when the object is situated in the near range.

The subdivision of the detection range into the near range and the far range is, as regards its boundaries, suitably performed with consideration given to the errors with which the distance detection is inflicted due to the signal amplitude information on the one hand and due to the signal propagation time information on the other hand. Generally, it holds true, as described above, that the distance detection performed on the basis of the signal propagation time information is the more precise the farther away the object is from the sensor system. Thus, there exists a distance limiting value from which on the error that may occur in distance detection based on the signal propagation time information, will exceed a specific lower limiting value. Thus, up to this distance value, the far range extends, or, from this distance value, the near range begins which then extends up to the surface of the sensor system. However, one could also define a third distance range, namely a medium or intermediate distance range, which is situated between the near range and the far range. Within this intermediate range, the two distance measurement methods both will provide distance values with errors which are within a pre-determinable range of errors. Thus, in this intermediate range, which in the manner described above can be localized within the detection range, use can be made either of one or of the other computation method for detecting the distance to the sensor system.

As evident from the above, the invention is based on the recognition that both the phase signal S4φ which, as explained, represents the light propagation time and thus the distance, and the amplitude signal S4a which actually represents the weakening that is experienced by the measurement signal, contain information which is dependent on the distance. The measurement errors in this respect are considerably dependent on the distance of the sensor system to the object O.

An essential problem is caused by the reflection degree $R_0$ of the object O which will adulterate the distance measurement based on amplitude signal S4a. A reliable absolute distance measurement on the basis of the amplitude signal S4a has not been generally possible up to now, since the amplitude of the sensor signal is dependent on the reflection degree $R_0$ of the object O and this reflection degree $R_0$ is normally not known. In contrast thereto, it is principally possible to make use of the phase signal S4φ for distance measurement, but this signal is increasingly noisy in the near range and thus has only a limited resolution.

According to the invention, these two signals will be combined into a common output signal so as to obtain all advantages of the two individual signals together.

The essential inventive step, however, consists eliminating from the equations the reflection degree $R_0$ of the object O whose distance shall be determined. For this purpose, the up to now missing information on the reflection degree $R_0$ is obtained from the observation of the phase signal S4φ. Thus, the value represented by the amplitude signal S4a can be corrected through calculation.

Under the precondition that the useful transmitter H, the compensation transmitter K and the receiver D are located roughly at the same site as compared to the object O which is to be measured, it can be assumed that the magnitude of the amplitude signal S4a is dependent on the inverse power of four of the distance of the sensor system to the object.

Thus, in the near range, the amplitude signal S4a will become particularly large, whereas the propagation time and thus the phase signal S4φ are particularly small. As a consequence, the precision of the propagation time measurement will decrease and that of the amplitude measurement will increase, under the assumption of a constant error e.g. as a result of a noise level existing in the system.

Thus, the measurement signals can be approximated by the following formulas, with S4a as the amplitude signal and S4φ as the phase signal:

$$S4a = k_a R_o \frac{1}{r^4} + e_a$$

$$S4\varphi = k_\varphi r + e_\varphi$$

Here, $k_a$ and $k_\varphi$ represent system constants which are specific for the realization of the system, $e_a$ describes the error in amplitude measurement, $e_\varphi$ the error in the phase measurement or delay measurement (light or signal propagation time measurement) and r describes the distance of the object from the sensor.

From these, there can be determined respectively the sought distance r:

$$\sqrt[4]{\frac{k_a R_o}{S4a - e_a}} = r$$

$$\frac{S4\varphi - e_\varphi}{k_\varphi} = r$$

For the determination, however, the unknown errors have to be set to zero:

$$\sqrt[4]{\frac{k_a R_o}{S4a}} = r_{ma}$$

$$\frac{S4\varphi}{k_\varphi} = r_{m\varphi}$$

Here, $r_{ma}$ represents the distance measured by the amplitude method, and $r_{m\varphi}$ represents the distance measured by the propagation time measurement. The respective resultant absolute error $(r_{ma}-r; r_{m\varphi})$ relative to the true distance is:

$$r_{ma} - r = \sqrt[4]{\frac{k_a R_o}{S4a}} - \sqrt[4]{\frac{k_a R_o}{S4a - e_a}}$$

$$r_{m\varphi} - r = \frac{e_\varphi}{k_\varphi}$$

The amplitude error can be expressed as a function of the distance:

$$r_{ma} - r = r\left(\sqrt[4]{\frac{1}{1 + \frac{e_a r^4}{k_a R_o}}} - 1\right)$$

Figure 2:
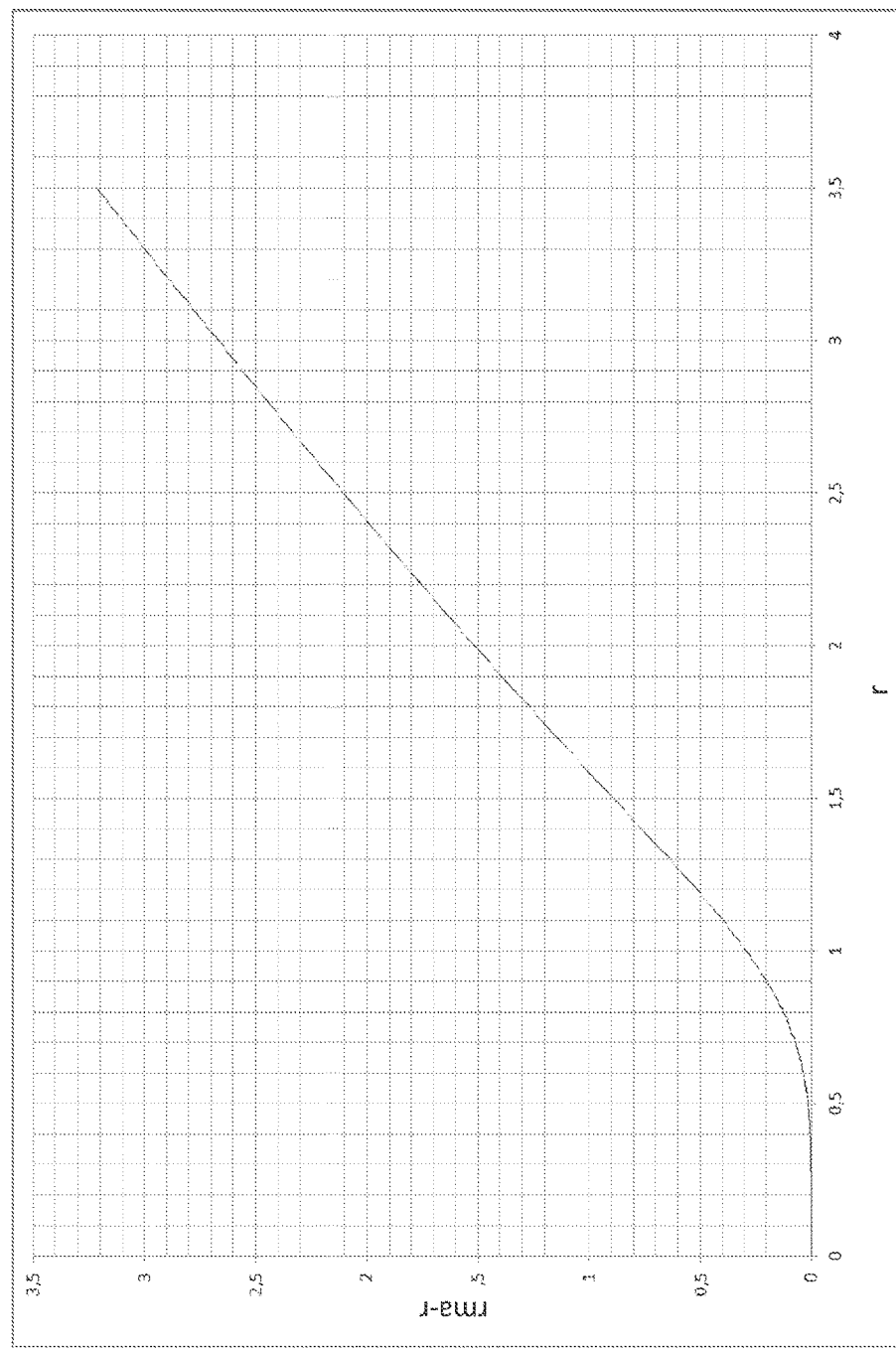
FIG. 2 is a graph illustrating the development of the error $r_{ma}$-r in dependence on the distance r in linear representation.

FIG. 1 shows the development of the error $r_{ma}-r$ in dependence on the distance r normalized to $$\sqrt[4]{\frac{e_a}{k_a R_o}}$$

in dual-logarithmic representation, and FIG. 2 shows the same in linear representation.

It is evident that the error vanishes for large amplitudes S4a. Thus, there can be formed a coefficient A:

$$A = \left(\frac{r_{ma} - r}{r_{m\varphi} - r}\right) = \frac{k_\varphi \sqrt[4]{k_a R_o}}{e_\varphi} \cdot \frac{\sqrt[4]{S4a - e_a} - \sqrt[4]{S4a}}{\sqrt[4]{S4a}\sqrt[4]{S4a - e_a}}$$

Figure 3:
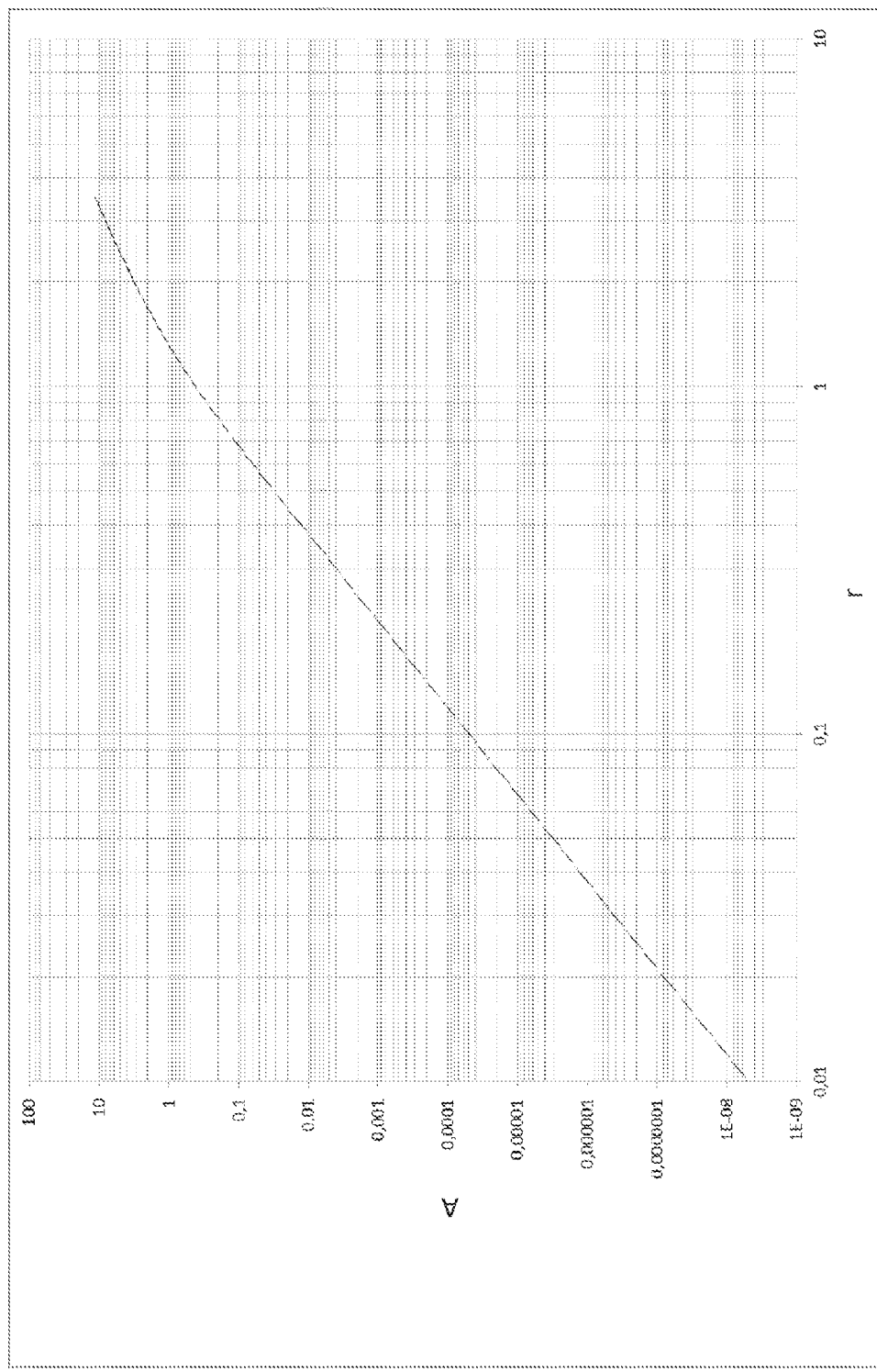
FIG. 3 is a graph illustrating a coefficient A in dependence on the distance r in dual-logarithmic representation.
Figure 4:
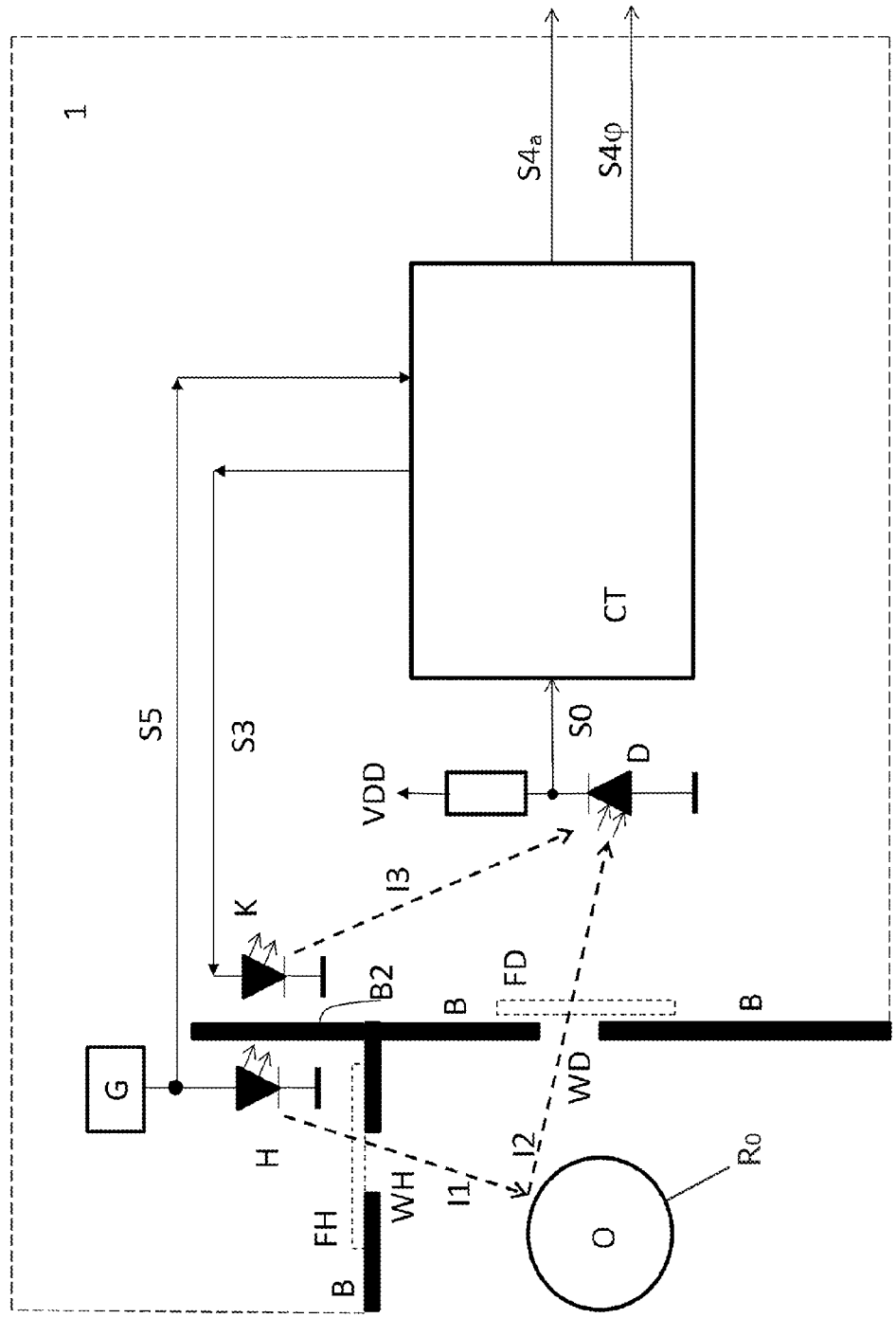
FIG. 4 is a block diagram illustrating a system for optically measuring properties of at least one measurement path between a transmitter and a receiver, in accordance with one embodiment.
Figure 5:
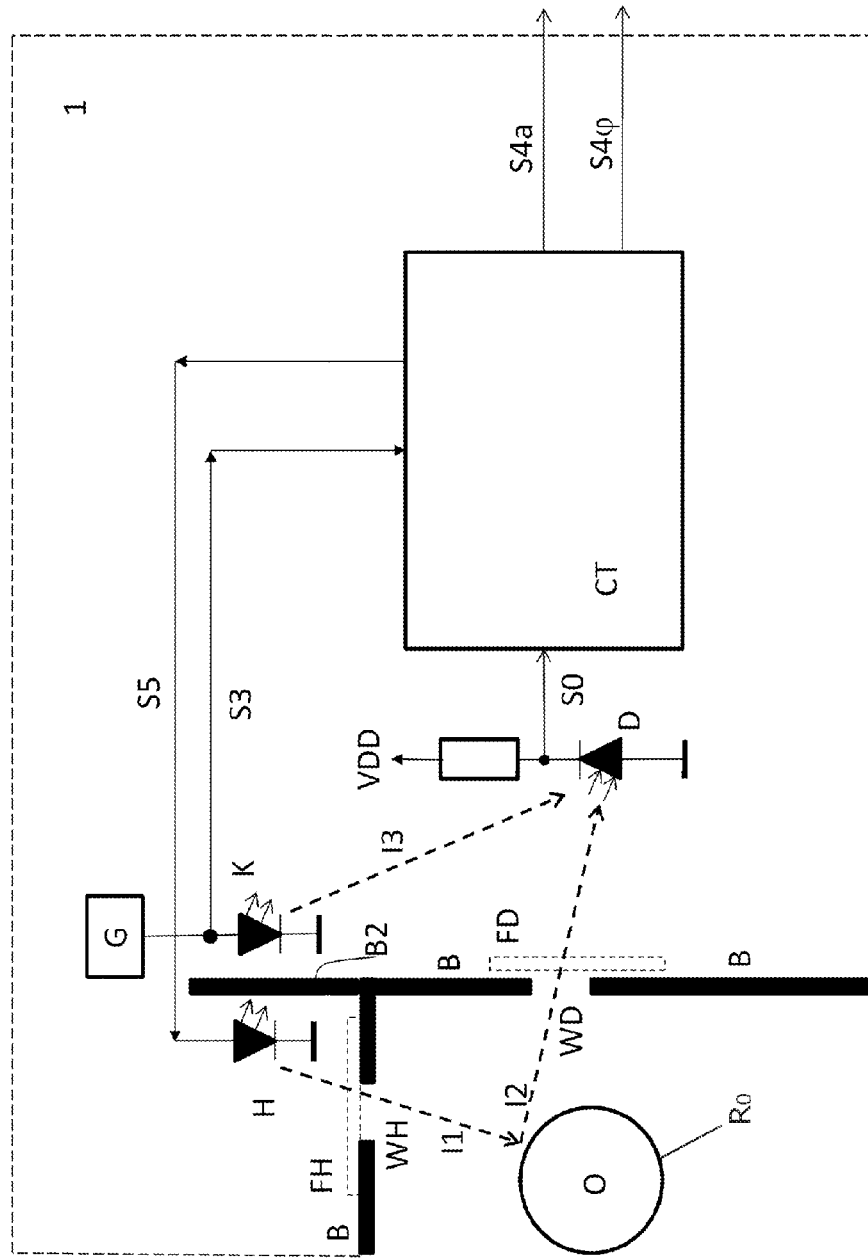
FIG. 5 is a block diagram illustrating a system for optically measuring properties of at least one measurement path between the transmitter and the receiver, in accordance with another embodiment.

FIG. 3 shows the coefficient A in dependence on r normalized to $$\sqrt[4]{\frac{e_a}{k_a R_o}}$$

in dual-logarithmic representation.

For A>1, the distance determination of the object is preferably performed through phase measurement by means of the phase signal S4φ. For A<1 the distance determination of the object is preferably performed through amplitude measurement by means of the amplitude signal.

The limit A=1 is given by:

$$\frac{e_\varphi}{k_\varphi \sqrt[4]{k_a R_o}} \sqrt[4]{S4a_{limit}} \sqrt[4]{S4a_{limit} - e_a} = \sqrt[4]{S4a_{limit} - e_a} - \sqrt[4]{S4a_{limit}}$$

By $$\sqrt[4]{S4a_{limit} - e_a} = \sqrt[4]{S4a_{limit}} - e_a'$$

the equation is simplified to:

$$\frac{e_\varphi}{k_\varphi \sqrt[4]{k_a R_o}} \sqrt[4]{S4a_{limit}} \left(\sqrt[4]{S4a_{limit}} - e_a'\right) = -e_a'$$

This will result in the quadratic equation:

$$\left(\sqrt[2]{S4a_{limit}} - \sqrt[4]{S4a_{limit}}\, e_a'\right) + e_a' \frac{k_\varphi \sqrt[4]{k_a R_o}}{e_\varphi} = 0$$

with the solution $$S4a_{limit} = \left(-\frac{1}{2}e_a' \pm \sqrt{\frac{1}{4}e_a'^2 - e_a' \frac{k_\varphi \sqrt[4]{k_a R_o}}{e_\varphi}}\right)^2$$

If the amplitude signal S4a is above this limiting value S4a$_{limit}$, then, for the determining of the distance of object O, the amplitude measurement will be more favorable than the phase and respectively delay measurement.

It should be specifically stressed that the magnitude of the threshold value S4a$_{limit}$ is not dependent on the measured phase position by means of the phase signal S4φ but will depend exclusively on the values of the system and of the object O, such as e.g. refraction indices and specific damping of the media in the measurement path, degrees of reflection, scattering losses etc. In this regard, the error values $e_a$ and $e_\varphi$ as well as the constants $k_a$ and $k_\varphi$ have to be preset. The reflection fact or $R_0$ of the object O, however, is an unknown parameter.

It is evident from the above explanations that, by the dependencies, the space in front of a device of the invention is subdivided into at least three distance ranges, namely into 1) a far range in which, in amplitude measurement, the amplitude error $e_a$ is dominant and the phase error eφ is of subordinate relevance, 2) an intermediate distance range in which the amplitude signal S4a and the phase signal S4φ are affected by a similar error, and 3) a near range in which, in phase measurement, the phase error eφ is dominant and the amplitude error $e_a$ relative to the measurement signal is more or less irrelevant.

Empirically, the two limits between the far range and the intermediate distance range on the one hand and between the intermediate distance range and the near range on the other hand can be brought into congruence with the solutions of the above equation. In reality, however, it has also been experienced that the above simplified error model is not always valid. This is caused by the influence of the respective implementation so that, in the concrete application, the switch-over times can be systematically detected, also by way of an experiment.

Since an object during its approach toward the sensor has to traverse the intermediate distance range, this makes it possible, through a still somewhat precise measurement, to determine the distance and the reflection coefficient $R_0$. Therefore, the phase measurement in the near range does not need to provide a precise value anymore but only the recognition that the object is situated closer to the sensor than the limit value between the intermediate distance range and the near range.

Conversely, the amplitude measurement in the far range would be allowed to provide only the information that the object is more remote from the sensor than the range limit between the far range and the intermediate distance range.

Further, the transitions do not need to occur in a "hard" way. Instead, the detection system can be designed in such a manner that it will estimate the reflection value $R_0$ and the distance r on the basis of statistic properties.

In these statistic properties, the reliability level of the respective measurement is taken into consideration.

Thus, the reflection value $R_0$', which typically is stored in a memory, will be substantially changed only if the reliability of both signals S4a and S4φ is relatively high. Only then, the measurement system will deliver a two-dimensional signal which allows for the detection of two parameters, namely the distance r and the reflection value $R_0$.

When an object is approaching from the distance, it is first necessary to assume a default value for $R_0$. Therefore, the reliability of distance measurement by means of the amplitude signal S4a is low. Thus, it is reasonable to compute a reliability value both for $R_0$ and for r so that the systems processing the data will be given an indication on the precision.

Further, it is reasonable if the reliability value for the stored reflection value $R_0$ is allowed to go toward zero again, which is done on the basis of a time constant.

This is necessary so that the next far-field detection will not start with a wrong $R_0$.

In the far range, the measured distance (interval r) is determined as $$\frac{S4\varphi}{k_\varphi} \approx r$$

When the object has passed from the far range into the intermediate distance range, the confidence value of the signals S4a and S4φ increases far enough to allow for a two-dimensional measurement, notably with $$\frac{S4\varphi}{k_\varphi} \approx r$$

$$S4a \frac{S4\varphi^4}{k_a k_\varphi^4} \approx R_o$$

At the same time, a confindence function $V(R_0, r)$ can be formed which indicates the probability of an error.

It is reasonable to not carry along the stored value $R_0'$ directly with the measured value $R_0$ but to filter this value.

For instance, it is reasonable to change this value at certain time intervals $\Delta t$:

$$R'_{o\,n+1} = \frac{\sum_{i=1}^{n} k_1(R_0 - R_0') * V(R_o, r)}{\sum_{i=1}^{n} V(R_o, r)} - k_2 R'_{o\,n}$$

wherein this formula describes the system discretely.

The differential equation $$\frac{\delta}{\delta t} R'_o = k_1(R_0 - R_0') * V(R_0, r) - k_2 R'_o$$

describes the system continuously.

Thus, the functions S4φ(r) and S4a(r) describe two curves parameterized with the distance r. These two magnitudes, as described above, cannot change in a random manner when an object is being moved in front of the sensor system. Instead, these two signals have to change independently from each other in the manner predefined above.

In a concrete realization, the entire detection range consists of two measurement ranges merging into each other, namely of a preferably phase-measuring range (xm to about 0.5 m) and an adjoining, preferably intensity-based range (0.5 m to the surface and respectively the sensor).

Further, it appears reasonable to provide a power save mode because the phase measurement has an increased energy demand. In this case, the intensity signal will be permanently used as a measurement signal, and the phase measurement will be activated only temporarily or at specific points r in order to calibrate the amplitude measurement. In so far, it is favorable to make exclusive use of phase measurement only for large distances.

Thus, while there is total robustness against extraneous light, one will achieve obtain the operating range and the independence from—and knowledge of—the reflection degree of the amplitude measurement as well as the resolution and speed of the amplitude measurement especially in the near range (<0.5 m to the surface of the sensor system).

Individual features of the invention are indicated in items 1) to 11) specified hereunder, wherein the features summarized under the individual items only represent preferred exemplary embodiments and, particularly, also subgroups of feature items and combinations of features from different items will represent exemplary embodiments of the invention:

1) A method for optical measurement of the properties of at least one measurement path (I1,I2) arranged in front of a sensor system and extending between at least one useful transmitter (H) and a receiver (D) of the sensor system, wherein
   a) at least one generator (G) generates at least one band-width-limited useful-transmitter supply signal (S5),
   b) at least said useful-transmitter supply signal (S5) is used to control at least one useful transmitter (H),
   c) the useful transmitter (H) is operative to transmit a signal into at least one first section (I1) of a measurement path (I1,I2),
   d) said first section (I1) of the measurement path (I1,I2) in case of an existing object (O) is caused to end at said object (O), and, after the signal (O) has passed through said first section (I1) of the measurement path (I1,I2), the object (O) reflects or radiates or transmits the signal into at least one second section (I2) of the measurement path (I1,I2),
   e) at the end of the second section (I2) of the measurement path (I1,I2), the signal is received by at least one receiver (D) and is converted into at least one receiver output signal (S0),
   f) a feedback controller (CT) is operative to generate at least one compensation feed signal (S3) at least with the aid of said receiver output signal (S0) and said at least one transmitter supply signal (S5),
   g) at least said compensation feed signal (S3) is used to control at least one compensation transmitter (K),
   h) said compensation transmitter (K) is operative to radiate into at least one compensation transmission path (I3),
   i) at the end of said compensation transmission path (I3), at least said receiver (D) is caused to receive the signal of said compensation transmitter (K) in overlap with the signal of the transmitter (H),
   j) the feedback controller (CT) is operative to generate the compensation feed signal (S3) in such a manner that, as a result of said overlap in the receiver (D), a receiver output signal (S0) is obtained which, except for control errors and system noise, is substantially free of portions correlating with the transmitter supply signal (S5),
   k) the compensation feed signal (S3) is controlled either, in case of a mono-frequency transmitter supply signal (S5), according to magnitude and phase, or, in case of a band-width-limited transmitter supply signal (S5), according to magnitude and delay,
   l) the feedback controller (CT) is operative to detect two signals or values (S4a,S4φ) representing control parameters for magnitude and phase or for magnitude and delay, and
   m) in a phase farther downstream in the process, the existence and/or the distance (r) of an object (O) are determined on the basis of said two control parameters (S4a,S4φ) in dependence on the accuracies of these two parameters, said determination being performed in different reception ranges respectively on the basis of that parameter which in the respective reception range allows for the higher accuracy in the detection of the distance of the object to the sensor system, wherein, in a medium or intermediate distance range, any one of the two parameters or both parameters can be selectively used for detection of the distance of the object to the sensor system.

2) A method for optical measurement of the properties of at least one transmission path (I1,I2), wherein
   a) at least one generator (G) generates at least one band-width-limited compensation feed signal (S3),
   b) at least said compensation feed signal (S3) is used to control at least one compensation transmitter (K),
   c) said compensation transmitter (K) is operative to transmit, into at least one compensation transmission path (I3), a signal which at the end of the compensation transmission path (I3) is received by at least one receiver (D) and is converted into at least one receiver output signal (S0),
   d) a feedback controller (CT) is operative to generate at least one transmitter supply signal (S5) at least with the aid of said receiver output signal (S0) and said at least one compensation feed signal (S3),
   e) at least said transmitter supply signal (S5) is used to control at least one useful transmitter (H),
   f) said useful transmitter (H) is operative to radiate a signal into at least one first section (I1) of a measurement path (I1,I2),
   g) the first section (I1) of the measurement path (I1,I2) in case of an existing object (O) is caused to end at said object (O), and, after the signal (O) has passed through said first section (I1) of the measurement path (I1,I2), the object (O) reflects or transmits or radiates the received signal as a signal S(22) into at least one second section (I2) of the measurement path (I1,I2),
   h) at the end of at least said second section (I2) of said measurement path (I1,I2), at least said receiver (D) is caused to receive the signal of said useful transmitter (H) in overlap with the signal of the compensation transmitter (K),
   i) the feedback controller (CT) is operative to generate the transmitter supply signal (S5) in such a manner that, as a result of said overlap in the receiver (D), a receiver output signal (S0) is obtained which, except for control errors and system noise, is substantially free of portions correlating with the compensation feed signal (S3),
   j) the transmitter supply signal (S5) is controlled, in case of a mono-frequency compensation feed signal (S3), according to magnitude and phase, or, in case of a band-width-limited compensation feed signal (S3), according to magnitude and delay,
   k) the feedback controller (CT) is operative to detect two signals or values (S4a,S4φ) representing control parameters for magnitude and phase or for magnitude and delay, and
   l) in a phase farther downstream in the process, the existence and/or the distance (r) of an object (O) in the measurement path (I1,I2) are determined on the basis of said two control parameters (S4a,S4φ) in dependence on the accuracies of these two parameters, said determination being performed in different reception ranges respectively on the basis of that parameter which in the respective reception range allows for the higher accuracy in the detection of the distance of the object to the sensor system, wherein, in a medium or intermediate distance range, any one of the two parameters or both parameters can be selectively used for detection of the distance of the object to the sensor system.

3) The method according to sub-item 1) or 2), wherein, in at least one section of the distance (r), the reflection coefficient (R0) of the object (O) is determined.

4) The method according to any one or a plurality of sub-items 1) to 3), wherein, in at least one section of the distance (r), the reflection coefficient (R0) of the object (O) is not determined but use is made of a value (R0') stored as a reflection coefficient.

5) The method according to any one or a plurality of sub-items 1) to 4), wherein, in at least one section of the distance (r), a stored reflection coefficient (R0') is used, and the distance (r) of the object (O) is determined from the control parameter (S4a) assigned to the amplitude control.

6) The method according to any one or a plurality of sub-items 1) to 5), wherein, in at least one section of the distance (r), use is made of a reflection coefficient (R0) detected from the control parameters for the amplitude (S4a) and for the delay or phase (S4φ) and the distance (r) of the object (O) is determined from the control parameters for the amplitude (S4a) and/or the phase (S4φ).

7) The method according to any one or a plurality of sub-items 1) to 6), wherein, in at least one section of the distance (r), the distance (r) of the object (O) is determined from the control parameter (S4φ) assigned to the phase or delay control.

8) The method according to any one or a plurality of sub-items 1) to 7), wherein, from the control parameters for the amplitude (S4a) and for the delay or phase (S4φ) and from the distance (r) of the object (O) detected therefrom at least at a first point of time, or from the reflection coefficient (R0) detected at least at a first time, a conclusion is made to the distance (r) or to the reflection coefficient (R0), the point of time of said conclusion being later than said first point of time.

9) The method according to any one or a plurality of sub-items 1) to 8), wherein the measurement method is selected in dependence on at least one amplitude control signal (S4a) in comparison to a threshold value.

10) The method according to any one or a plurality of sub-items 1) to 9), wherein a virtual reflection coefficient (R0') is computed and/or stored.

LIST OF REFERENCE NUMERALS

I1 first section of the measurement path
I2 second section of the measurement path
I3 compensation transmission path
$R_0$ reflection coefficient
$R_0'$ stored reflection coefficient
S0 receiver output signal
S3 compensation supply signal
S4a amplitude (control) signal
$S4a_{limit}$ limiting value
S4φ phase control signal
S5 useful-transmitter supply signal
A coefficient
B screening of the sensor against ambient light
B2 screening of the transmitter against direct radiation into the receiver
CT feedback controller
D receiver
FD filter in front of the window for receiving the signal from the object FH filter in front of the window for emission of the signal of the transmitter
G generator
H useful transmitter
K compensation transmitter
O object
r distance
VDD supply voltage
WD window for reception of the signal from the object
WH window for emission of the signal of the transmitter

The invention claimed is:

1. A method for detecting the distance of an object to an optically operating sensor system covering a detection range, said method comprising:
   emitting, from at least one transmitter of the sensor system, an optical signal;
   receiving, by a receiver of the sensor system, the optical signal which has been emitted by the at least one transmitter and has been forwarded from the object; and
   generating, by an evaluation unit of the sensor system, signal amplitude information assigned to the received optical signal, wherein, on the basis of said signal amplitude information, with knowledge of an optical parameter describing the optical properties of the object for the forwarding of the optical signal the distance of the object to the transmitter system can be detected, and signal running-time information assigned to the received optical signal, wherein, on also the basis of said signal running-time information, the distance of the object to the transmitter system can be detected,
   wherein the detection range is divided at least into a far range and a near range,
   wherein the object, when approaching toward the sensor system, is moved first through the far range and subsequently through the near range of the detection range,
   wherein, if the object is situated in the far range, its distance to the sensor system is detected on the basis of the running-time information of the received optical signal,
   wherein, if the object is situated in the near range, its distance to the sensor system is detected on the basis of an assumed value or a computed value of the optical parameter of the object and on the basis of the amplitude information of the received optical signal, and
   wherein, if the object is situated in the far range, the optical parameter is computed on the basis of the distance of the object to the sensor system as detected from the running-time information of the received optical signal, and on the basis of the amplitude information of the received optical signal.

2. The method according to claim 1, wherein the optical parameter of the object is respectively updated with each approach of the object to the sensor system.

3. The method according to claim 2, wherein each updated optical parameter is stored and is used for the subsequent detection of the distance between the object in the far range and the sensor system.

4. The method according to claim 1, wherein the detection range is further divided into an intermediate range situated between the far range and the near range, and wherein, in said intermediate range, the detection of the distance of the object to the sensor system is performed selectively on the basis of the amplitude information or the running-time information of the received optical signal.

5. The method according to claim 1, wherein the detection of the distance of the object to the sensor system on the basis of the amplitude information as well as on the basis of the running-time information of the received optical signal is in both cases afflicted by an error, that, when detecting the distance of the object to the sensor system on the basis of the amplitude information of the received optical signal, the error becomes smaller with increasing distance of the object to the sensor system and, when detecting said distance on the basis of the running-time information of the received optical signal, the error becomes larger with decreasing distance of the object to the sensor system, and wherein the boundaries of the far range and the near range are predetermined on the basis of limiting values of the error for the detection of the distance of the object to the sensor system on the basis of the amplitude information and the running-time information of the received optical signal.

6. The method according to claim 5, wherein the detection range is further divided into an intermediate range situated between the far range and the near range, and wherein, in said intermediate range, the detection of the distance of the object to the sensor system is performed selectively on the basis of the amplitude information or the running-time information of the received optical signal, wherein the boundaries of the intermediate range are defined by the limiting values of the error.

7. The method according to claim 1, wherein the sensor system comprises a compensation transmitter configured to compensate for a potential influence of ambient light received by the receiver during the generation of the signal amplitude information and during the generation of the signal running-time information of the received optical signal.

8. A device for performing the method according to claim 1.

9. An optically operating sensor system for detecting the distance of an object to the optically operating sensor system covering a detection range, the system comprising:
   at least one transmitter configured to emit an optical signal;
   a receiver configured to receive the optical signal which has been emitted by the at least one transmitter and has been forwarded from the object; and
   an evaluation unit configured to generate signal amplitude information assigned to the received optical signal, wherein, on the basis of said signal amplitude information, with knowledge of an optical parameter describing the optical properties of the object for the forwarding of the optical signal, the distance of the object to the transmitter system can be detected, and signal running-time information assigned to the received optical signal, wherein, on also the basis of said signal running-time information, the distance of the object to the transmitter system can be detected,
   wherein the detection range is divided at least into a far range and a near range,
   wherein the object, when approaching toward the sensor system, is moved first through the far range and subsequently through the near range of the detection range,
   wherein, if the object is situated in the far range, its distance to the sensor system is detected on the basis of the running-time information of the received optical signal,
   wherein, if the object is situated in the near range, its distance to the sensor system is detected on the basis of an assumed value or a computed value of the optical parameter of the object and on the basis of the amplitude information of the received optical signal, and wherein, if the object is situated in the far range, the optical parameter is computed on the basis of the distance of the object to the sensor system as detected from the running-time information of the received optical signal, and on the basis of the amplitude information of the received optical signal.

* * * * *